D. H. WILSON.
TELEPHONE REPEATING DEVICE.
APPLICATION FILED JAN. 2, 1913.

1,097,960.

Patented May 26, 1914.

Witnesses.
Edward T. Wray
Elmer M. Liessmann

Inventor.
David H. Wilson.
by Parker & Carter
Attorneys.

UNITED STATES PATENT OFFICE.

DAVID H. WILSON, OF NEW YORK, N. Y.

TELEPHONE REPEATING DEVICE.

1,097,960.  Specification of Letters Patent.  Patented May 26, 1914.

Application filed January 2, 1913. Serial No. 739,830.

*To all whom it may concern:*

Be it known that I, DAVID H. WILSON, a citizen of the United States, residing at New York, in the county of New York and State of New York, have invented a certain new and useful Improvement in Telephone Repeating Devices, of which the following is a specification.

This invention relates to telephone repeating devices and has for its object to provide a new and improved device of this description.

The invention is illustrated in the accompanying drawings, wherein—

Figure 1:
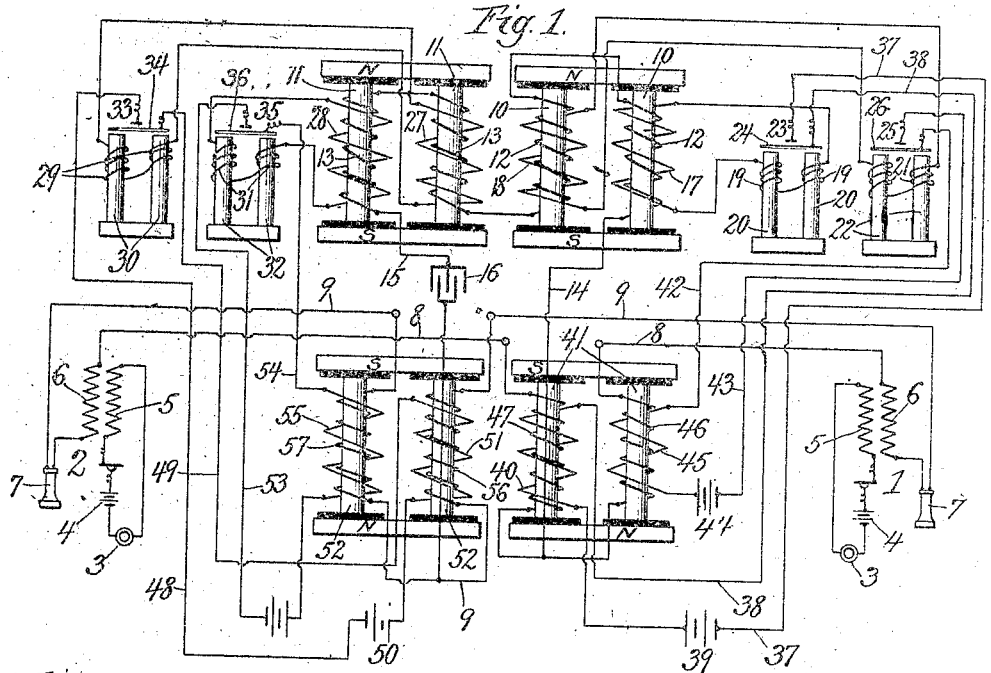
Figure 2:
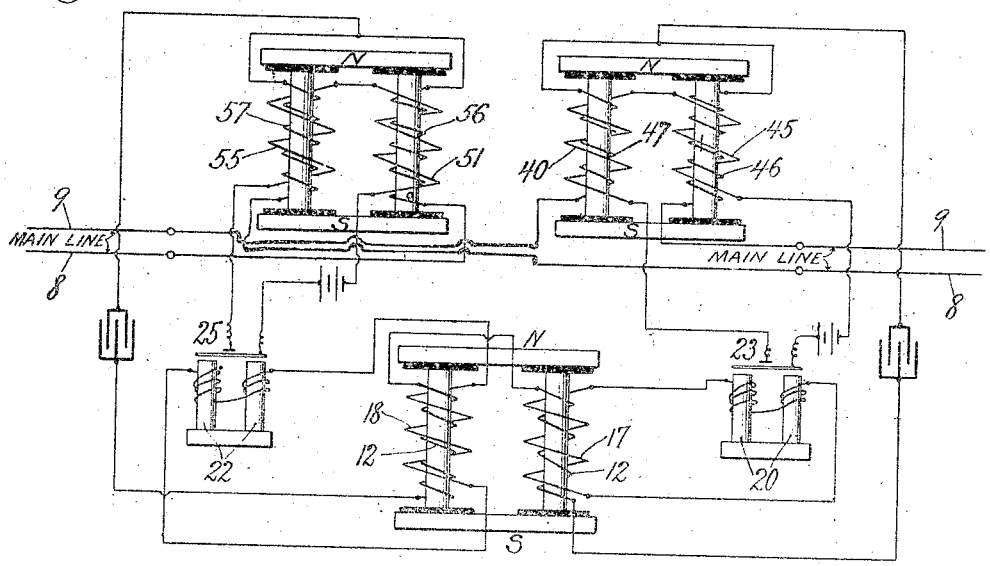

Figure 1 is a diagrammatic view showing one form of the invention; Fig. 2 is a diagrammatic view showing a modified construction.

Like numerals refer to like parts throughout the several figures.

Referring now to Fig. 1 herein for purpose of illustration I have shown diagrammatically one form of the invention. I have illustrated two separated telephone stations 1 and 2, which may be supplied with any desired instruments. As herein shown, these stations are provided with the transmitters 3, source of current supply 4 and induction coils with the primary coils 5 and secondary coils 6, there being receivers 7 in circuit with the secondary coils. The two stations are connected together by the main line circuits 8 and 9. Located at any suitable point is a repeating apparatus comprising as it were three elements, one of these elements is an electromagnetic device and as illustrated in Fig. 1 is made up of the cores 10 connected together at their ends and the cores 11 connected together at their ends but separate from the cores 10. The cores 10 are provided with the primary coils 12 and the cores 11 with the primary coils 13. All of these coils are connected in series with each other, and one end coil as, for example, one of the coils 12 is connected by the conductor 14 with one branch of the main line circuit as, for example, the branch 8. The other end coil, as for example, one of the coils 13 is connected by the conductor 15 with the other branch 9 of the main line circuit, there being preferably a condenser 16 in the connection 15. It will thus be seen that these primary coils 12 and 13 are bridged, as it were, across the main line, and that when there is a talking current in the main line, a portion thereof passes through these primary coils. The cores 10 are provided with separate secondary coils 17 and 18. The coil 17 is connected to the coils 19 on the poles of the permanent magnet 20 while the coil 18 is connected to the coils 21 on the poles of the permanent magnet 22. A transmitter 23 is associated with the permanent magnet 20 and has its diaphragm 24 arranged so as to be actuated by the poles of said permanent magnet. A transmitter 25 is associated with the permanent magnet 22 and has its diaphragm arranged so as to be actuated by the poles of the permanent magnet. The cores 11 are provided with secondary coils 27 and 28. The coil 27 is connected in circuit with the coils 29 on the poles of the permanent magnet 30. The coil 28 is connected in circuit with the coils 31 on the poles of the permanent magnet 32. A transmitter 33 is associated with the permanent magnet 30 and arranged so that its diaphragm 34 is actuated by the poles thereof. A transmitter 35 is associated with the permanent magnet 32 and arranged so that its diaphragm 36 is actuated by the poles of said magnet. The transmitter 23 is connected by conductors 37 and 38 with the source of electric supply 39 and the primary coil 40 on one of the cores 41. The transmitter 25 is connected by conductors 42 and 43 with the source of electric supply 44 and the primary coil 45 on the other core 41. The two cores 41 are connected together. The cores 41 are provided with the secondary coils 46 and 47 also located on the cores 41. These secondary coils are connected in series and are connected to one branch of the main line circuit as, for example, the branch 8. The transmitter 33 is connected by conductors 48 and 49 with the source of electric supply 50 and the primary coil 51 on one of the cores 52. The transmitter 35 is connected by conductors 53 and 54 with the primary coil 55 on the other core 52. The two cores 52 are connected together. The cores 52 are provided with the secondary coils 56 and 57. These secondary coils are connected in series and are connected in the branch 9 of the main line circuit. The conductor 14 connected with the coils 12 is connected to the branch 8 of the main line circuit intermediate the two secondary coils 46 and 47 while the conductor 15 connected with the coils 13 is connected to the branch 9 of the main line circuit intermediate the two secondary coils 56 and 57. When the device is in operation and the operator talks, for example, into one of the transmitters 3 at one of the stations 1 or 2, the talking current is set up in the main line and will pass therealong to the repeating apparatus. A portion of the current will then pass by way of conductors 14 and 15 through the high wound primary coils 12 and 13 on the cores 10 and 11. These coils are preferably made up of a large number of turns of fine wire. A talking current is thereby induced in each of the independent coils 17, 18, 27 and 28. These coils are preferably made up of a comparatively small number of turns of large wire and the current induced therein passes through the coils 19, 21, 29 and 31 on to the poles of the permanent magnets 20, 22, 30 and 32. These several currents then act simultaneously on the four transmitters 23, 25, 33 and 35. A talking current is then simultaneously set up in the several primary circuits associated with said transmitters and in the primary coils 40, 45, 51 and 55. This talking current can easily be made a strong current by properly apportioning the circuits and sources of electric supply and a strong talking current is thereby induced in the secondary coils 46, 47, 56 and 57 in the main line circuit thus greatly strengthening the main line talking current and greatly increasing its effectiveness. The cores 10 and 11 and their associated coils act as amplifiers and the permanent magnets with the coils or bobbins thereon and the transmitters are acted upon by the amplifier so as to produce a strong talking current corresponding with that in the main line, while the cores 41 and 52 and the coils thereon act as transformers or induction coils in the main line circuit to impress the strength of the talking current on the main line. The several coils are connected to the branches in the main line circuit so as to balance each other, that is, so as to produce a balanced condition.

In Fig. 1 I have shown a particular construction of my apparatus but it is, of course, evident that the parts may be varied in form, construction and arrangement and some of the parts omitted and others used with parts not herein shown without departing from the spirit of my invention. In Fig. 2, for example, I have shown the amplifiers as having only the two primary coils 12 which are connected in series and connected by means of condensers to the two branches of the main line circuit intermediate the coils 46 and 47, and 56 and 57, there being only the two primary coils 17 and 18 and the two permanent magnets 20 and 22 and the two transmitters 23 and 25. The primary coils 40 and 45 of the transformer are connected in series and in circuit with the transmitter 23 while the primary coils 51 and 55 are connected in series and in circuit with the transmitter 25.

By means of my present invention, I am enabled to very greatly increase the power and efficiency of the apparatus and to transmit the voice currents through much longer distances than heretofore.

I claim:

1. A telephone repeating device comprising a main line circuit, a plurality of primary coils in series and connected across said main line circuit, a plurality of cores about which said primary coils are wound, a plurality of secondary coils on said cores, a plurality of permanent magnets, coils on said magnets connected with said secondary coils, a plurality of transmitters associated with said permanent magnets so as to be actuated thereby, sources of electric supply connected in circuit with said transmitters, primary coils connected in circuit with said transmitters, cores upon which said primary coils are wound, two sets of secondary coils associated with said primary coils, one set connected with one branch of the main line circuit, and the other set connected with the other branch of the main line circuit.

2. A telephone repeating device comprising a main line circuit, a series of coils connected with said main line circuit, cores about which said coils are wound, a second series of coils wound about said cores, a second set of cores separate from the first mentioned cores and provided with coils in circuit with said second set of coils, transmitters associated with said latter cores so as to be actuated thereby, a third set of cores containing primary and secondary coils, the primary coils connected in circuit with said transmitters, sources of electric supply in said circuit, the said secondary coils connected in circuit with the main line.

3. A telephone repeating device comprising a main line circuit, a series of coils connected with said main line circuit, cores about which said coils are wound, a second series of coils wound about said cores, a second set of cores separate from the first mentioned cores and provided with coils in circuit with said second set of coils, transmitters associated with said latter cores so as to be actuated thereby, a third set of cores containing primary and secondary coils, the primary coils connected in circuit with said transmitters, source of electric supply in said circuit, the said secondary coils connected in circuit with the main line, said secondary coils divided into two sets, the coils of each set in series with each other, the coils of one set connected with one branch of the main line circuit and the coils of the other set connected with the other branch thereof.

4. A telephone repeating device comprising a main line circuit, a plurality of primary coils in series with each other and connected across said main line circuit so as to receive current therefrom, cores about which said primary coils are wound, a plurality of independent secondary coils on said cores, a plurality of permanent magnets, separate coils on said magnets, each of said coils connected with one of said secondary coils and a transmitter associated with each permanent magnet so as to be actuated thereby, a primary coil connected in circuit with each transmitter, a source of electric supply in each of said circuits, two sets of cores about which said primary coils are wound, the secondary coils on each set being connected in series, the primary coils being independent of each other, the said secondary coils being connected in the main line circuit.

5. A telephone repeating device comprising a main line circuit, an amplifier provided with coils connected to the main line circuit and coils separate from the main line circuit, permanent magnets, coils thereon in circuit with the coils of the amplifier separate from the main line circuit, transmitters associated with the said permanent magnets so as to be actuated thereby, an induction coil provided with primary and secondary coils, the primary coils connected with said transmitters, sources of electric supply in circuit therewith, the secondary coils connected with the main line circuit.

6. A telephone repeating device comprising a main line circuit, a primary coil connected with said circuit, a core therefor, a secondary coil wound about said core, a permanent magnet, a coil on said permanent magnet, said coil connected in circuit with said secondary coil, a transmitter associated with said permanent magnet, an induction coil comprising a primary and secondary coil, the primary coil connected in circuit with said transmitter, a source of electric supply in said circuit, the secondary coil connected with the main line circuit.

7. A telephone repeating device comprising a main line, an amplifying device associated therewith having a primary and secondary coil, two induction coils associated with the main line circuit, each having a primary and secondary coil, the secondary coils of said induction coils forming two independent circuits.

8. A telephone repeating device comprising a main line circuit, a plurality of primary coils in series and connected across said main line circuit, a plurality of cores about which said primary coils are wound, four secondary coils on said cores, four permanent magnets, coils on said permanent magnets, connected with said secondary coils, four transmitters, one associated with each permanent magnet so as to be actuated thereby, a separate source of electric supply, connected in circuit with each of said transmitters, the primary coils connected in circuit with said transmitters, two sets of secondary coils associated with said primary coils, one set connected with one branch of the main line circuit and the other set connected with the other branch of the main line circuit.

In testimony whereof, I affix my signature in the presence of two witnesses this 24th day of December 1912.

DAVID H. WILSON.

Witnesses:
CORA M. WILSON,
JOHN R. DAVIDSON.